C. B. KING.
THROTTLE MECHANISM FOR AUTOMOBILES.
APPLICATION FILED JULY 21, 1910.
1,016,750.
Patented Feb. 6, 1912.
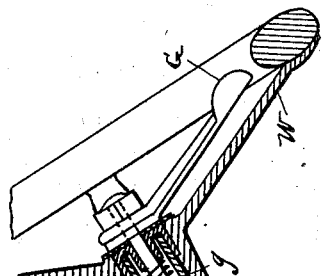
Fig. 1.
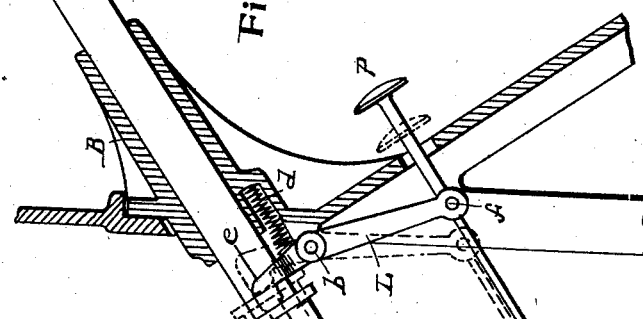
Fig. 2.
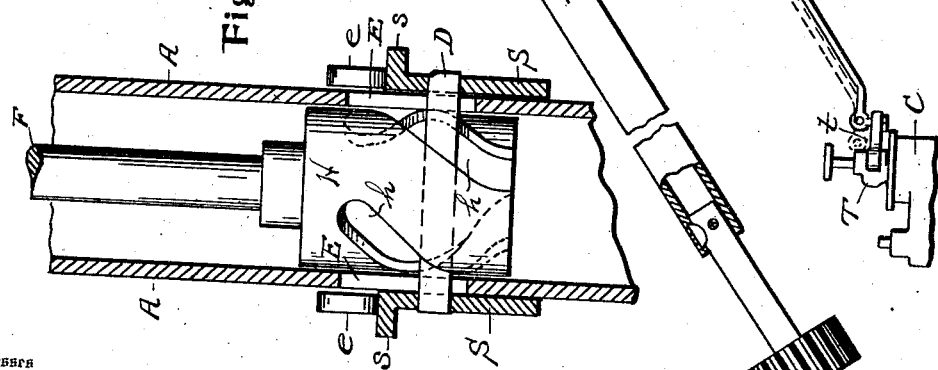
Witnesses
O. B. Baenziger
Lotta Lee Bray
Inventor
Charles B. King
By Parker & Burton
Attorneys

UNITED STATES PATENT OFFICE.

CHARLES B. KING, OF DETROIT, MICHIGAN, ASSIGNOR OF ONE-HALF TO ORA J. MULFORD, OF DETROIT, MICHIGAN.

THROTTLE MECHANISM FOR AUTOMOBILES.

1,016,750.

Specification of Letters Patent. Patented Feb. 6, 1912.

Application filed July 21, 1910. Serial No. 572,955.

*To all whom it may concern:*

Be it known that I, CHARLES B. KING, a citizen of the United States, residing at Detroit, county of Wayne, State of Michigan, have invented a certain new and useful Improvement in Throttle Mechanism for Automobiles, and declare the following to be a full, clear, and exact description of the same, such as will enable others skilled in the art to which it pertains to make and use the same, reference being had to the accompanying drawings, which form a part of this specification.

My invention relates to throttle mechanism for automobiles, and consists in the improvements hereinafter described and pointed out in the claims.

In the accompanying drawing,—Figure 1, is an elevation partly in section of an apparatus embodying my invention and so much of the adjacent parts of an automobile as is necessary to illustrate its connection therewith. Fig. 2, is a detail view, mostly in section.

A, is the steering post. The steering post A is cylindrical, and hollow for the greater part of its length, it is adapted to turn in a stationary bearing B which is supported in any usual way upon the automobile.

C, is the carbureter.

T, is a throttle valve adapted to turn to adjust the area of a passage connecting with the carbureter, to throttle the intake of the engine.

$t$, is a lever upon the throttle valve T by which said throttle valve is operated.

R, is a rod pivoted at one end to the outer end of the lever arm $t$ and supported toward the other end at $f$ by a lever arm L pivoted at $b$ to the frame of the automobile. Toward the other end the lever arm L forks into two branches $e$, $e$, which extend upon opposite sides and adjacent to the steering post A.

P, is a pedal upon the end of the rod R opposite to that which is connected with the lever arm $t$.

S, is a sleeve surrounding the steering post A and adapted to slide longitudinally thereon.

$s$, is an annular lug extending in a plane at right angles to the axis of the sleeve S.

There are two opposite slots E, E, formed through the walls of the steering post A. These slots extend parallel to the axis of said steering post.

D, is a pin extending through the slots E, E, and fixed in the sleeve S at its ends.

F, is a rod pivoted within the steering post A and coaxial therewith. The inner end of the rod F is provided with a head H which may fit against the interior surface of the steering post A and is adapted to turn therein.

$h$, $h$, are spiral slots formed in the head H. The pin D extends through the slots $h$, $h$.

The upper end of the rod F rests in the bearing at the upper end of the steering post A. G, is a lever arm secured upon the outer end of the rod F by which said rod may be rotated.

The outer ends of the forks $e$, $e$, of the lever arm L rest against the annular lug $s$ of the sleeve S and are normally held in contact therewith by the compression spring $d$.

The operation of the above described device is as follows:—In the ordinary operation of the steering mechanism the steering post A is turned by the wheel W in the usual way, the ends of the forks $e$, $e$, sliding upon the surface of the annular lug $s$ without affecting the throttle valve. If the operator wishes to suddenly close the throttle valve, he presses his foot against the pedal P turning the throttle valve T by means of the lever arm $t$ and rod R, the lever arm L swinging so as to bring the forks $e$, $e$, out of contact with the surface of the lug $s$. Should the operator wish to partly close the throttle valve T, he presses his thumb or finger against the outer end of the lever arm G turning the rod F and head H and acting through the side walls of the spiral slots $h$, $h$, against the pin D to move the sleeve S along the steering post A to rock the lever arm L, to operate the throttle valve T through the rod R and lever arm $t$.

$g$, is a torsion spring acting to turn the rod F to bring the parts into their normal position when they have been manipulated to force them therefrom.

What I claim is:—

1. The combination of an engine operating part, a steering post, a part adapted to slide lengthwise upon said steering post, means for adjusting said sliding parts to different positions along said steering post, a pivoted lever resting against said sliding part, and means connecting said engine operating part and lever so that any movement of said lever shall actuate said engine operating part, and a pedal adapted to impart motion to said lever that shall carry it out of contact with said sliding part, substantially as and for the purpose described.

2. The combination of a throttle valve, a steering post, a part adapted to slide lengthwise upon said steering post, means for adjusting said sliding parts to different positions along said steering post, a pivoted lever resting against said sliding part, and means connecting said throttle valve and lever so that any movement of said lever shall actuate said throttle valve, and a pedal adapted to impart motion to said lever that shall carry it out of contact with said sliding part, substantially as and for the purpose described.

3. The combination of an engine operating part, a steering post, a sleeve upon said steering post adapted to move longitudinally thereof but restrained from angular motion relative thereto, a part adapted to rotate within said steering post, a cam upon said rotating part within said steering post engaging said sleeve so as to cause a longitudinal movement of said sleeve when said part is turned, a lug upon said sleeve, a pivoted lever engaging against said lug, and a rod pivoted to said engine operating part and said lever, said lever having a pedal connected therewith, for the purpose described.

4. The combination of an engine operating part T, a pivoted lever L, a rod R connecting said lever and said engine operating part so that any movement of one will follow the movement of the other, a steering post A, a sleeve S on said steering post, slots in said steering post, a pin D extending through said slots, a rotatable head H in said steering post having a spiral slot $h$, engaging said pin, and means for rotating said head, the lever L resting against said sleeve, substantially as and for the purpose described.

5. The combination of an engine operating part T, a pivoted lever L, a rod R connecting said lever and said engine operating part so that any movement of one will follow the movement of the other, a steering post A, a sleeve S on said steering post, slots in said steering post, a pin D extending through said slots, a rotatable head H in said steering post having a spiral slot $h$ engaging said pin, and means for rotating said head, the lever L resting against said sleeve, and a pedal P adapted to oscillate said lever.

In testimony whereof, I sign this specification in the presence of two witnesses.

CHARLES B. KING.

Witnesses:
LOTTA LEE BRAY,
ELLIOTT J. STODDARD.